United States Patent
Behaghel et al.

(10) Patent No.: US 8,721,264 B2
(45) Date of Patent: May 13, 2014

(54) CENTRIPETAL AIR BLEED FROM A TURBOMACHINE COMPRESSOR ROTOR

(75) Inventors: Laurent Donatien Behaghel, Montgeron (FR); Laurent Gille, Dammarie les lys (FR); Benjamin Philippe Pierre Pegouet, Cergy (FR)

(73) Assignee: SNECMA, Paris (FR)

( * ) Notice: Subject to any disclaimer, the term of this patent is extended or adjusted under 35 U.S.C. 154(b) by 824 days.

(21) Appl. No.: 12/989,497

(22) PCT Filed: Apr. 16, 2009

(86) PCT No.: PCT/FR2009/000446
§ 371 (c)(1),
(2), (4) Date: Oct. 25, 2010

(87) PCT Pub. No.: WO2009/133308
PCT Pub. Date: Nov. 5, 2009

(65) Prior Publication Data
US 2011/0058941 A1    Mar. 10, 2011

(30) Foreign Application Priority Data
Apr. 24, 2008  (FR) .................................... 08 02297

(51) Int. Cl.
F04D 29/00    (2006.01)

(52) U.S. Cl.
USPC ........................................ 415/115; 415/176

(58) Field of Classification Search
USPC ............ 415/116, 176, 178, 144, 145; 416/95; 60/785
See application file for complete search history.

(56) References Cited

U.S. PATENT DOCUMENTS

| | | | |
|---|---|---|---|
| 3,085,400 A | 4/1963 | Sonder et al. | |
| 3,647,313 A | 3/1972 | Koff | |
| 4,795,307 A * | 1/1989 | Liebl | 415/115 |
| 5,203,162 A * | 4/1993 | Burge | 60/785 |
| 6,361,277 B1 * | 3/2002 | Bulman et al. | 416/96 R |
| 6,398,487 B1 * | 6/2002 | Wallace et al. | 415/115 |
| 2,003,133 A1 | 7/2003 | Avignon et al. | |
| 6,732,530 B2 * | 5/2004 | Laurello et al. | 60/782 |
| 6,857,851 B2 | 2/2005 | Avignon et al. | |
| 7,011,490 B2 * | 3/2006 | Albrecht et al. | 415/9 |
| 7,144,218 B2 * | 12/2006 | Dube et al. | 415/189 |
| 2004/0191058 A1 * | 9/2004 | Baumann et al. | 415/144 |

FOREIGN PATENT DOCUMENTS

| | | |
|---|---|---|
| DE | 865 773 | 2/1953 |
| DE | 36 06 597 | 2/1987 |
| EP | 1 120 543 | 8/2001 |
| EP | 1 329 591 | 7/2003 |
| FR | 2 614 654 | 11/1988 |
| FR | 2 672 943 | 8/1992 |

OTHER PUBLICATIONS

Translation of DE 865,773.*
International Search Report issued Dec. 2, 2009 in PCT/FR09/000446 filed Apr. 16, 2009.
U.S. Appl. No. 12/988,176, filed Oct. 25, 2010, Pegouet.

* cited by examiner

Primary Examiner — Nathaniel Wiehe
Assistant Examiner — Ryan Ellis
(74) Attorney, Agent, or Firm — Oblon, Spivak, McClelland, Maier & Neustadt, L.L.P.

(57) ABSTRACT

A compressor rotor for a turbomachine including at least two disks on a common axis carrying blades and connected together by a tubular wall, forming a surface of revolution, and a centripetal air bleed mechanism including air passages passing through the tubular wall, together with a wall extending along the tubular wall from the through passages up to one of the disks to channel the air stream inside the tubular wall.

19 Claims, 3 Drawing Sheets

A-A

CENTRIPETAL AIR BLEED FROM A TURBOMACHINE COMPRESSOR ROTOR

BACKGROUND OF THE INVENTION

1. Field of the Invention

The present invention relates to centripetal air bleed means in a compressor rotor of a turbomachine such as an airplane turboprop or turbojet.

2. Description of the Related Art

The bladed wheels of a compressor rotor are connected together by a tubular wall forming a substantially cylindrical or frustoconical surface of revolution that extends coaxially between the disks. This wall connecting the disks together may be formed integrally with a first disk or it may be put into place and fastened, e.g. by brazing or welding, at one of its axial ends on a lateral face of the first disk, and its opposite axial end may include an annular flange fastened, e.g. by nut-and-bolt type means, to a second disk.

It is known to fit the rotor with centripetal-flow air bleed means for feeding systems for ventilating and/or cooling downstream stages of the compressor and turbine rims of the turbomachine, and also for purging the turbomachine.

In the prior art, these bleed means comprise passages formed through the wall connecting together the compressor disks and opening out into an annular chamber formed inside the wall between two rotor disks.

A portion of the air flowing in the flow section of the compressor is bled off via the through passages in the wall of the rotor, and it passes into the annular chamber where it flows centripetally along the disks of the rotor, and then flows from upstream to downstream inside the turbomachine and outside an axial cylindrical sheath, in order to reach the turbine. However, turbulence and head losses in the annular chamber between the rotor disks are considerable, which leads to air being bled from a downstream stage of the compressor and therefore leads to an increase in the specific consumption of the turbomachine.

Furthermore, the bleed air is heated because of its high speed of rotation compared with that of the disks. When the air entrainment coefficient Ke (which is equal to the ratio of the tangential speed of the bleed air flowing in the turbomachine divided by the speed of rotation of the rotor of the turbomachine compressor) is greater than 1, it is necessary to increase the flow rate of the bleed air in order to ensure proper cooling of the components of the turbine. However, in certain zones, in particular in the interdisk chamber and in the vicinity of the cylindrical sheath, the coefficient Ke may be as high as 2.5 in the prior art.

In order to reduce that drawback, proposals have been made to mount an annular row of radial tubes in the chamber between the disks, which tubes are fastened to the disks around the sheath by appropriate means (see document EP-A1-1 262 630). The air bled through the through passages in the connection wall is constrained to pass along the radial tubes, which turn at the same speed as the disks. The air leaving these tubes comes to the level of the cylindrical sheath at a speed that is equivalent to that of the disks (Ke=1), thereby making it possible to limit head losses and to limit the increase in the temperature of the bleed air.

Nevertheless, the head losses at the inlet to the annular chamber remain high. Furthermore, the means for fastening the radial tubes are complex since they need to limit vibration of the tubes when in operation, thereby leading to relatively high costs and to an increase in weight.

BRIEF SUMMARY OF THE INVENTION

A particular object of the invention is to provide a solution to those problems of the prior art that is simpler, more effective, and less expensive.

To this end, the invention provides a compressor rotor of a turbomachine, the rotor comprising at least two disks on a common axis carrying blades and connected together by a generally tubular wall forming a surface of revolution coaxially about the axis of the disk, and centripetal air bleed means comprising air passages passing through the wall and opening out into a chamber formed inside the tubular wall and between the two disks, the rotor being characterized in that an air-guide wall is mounted inside the chamber and comprises a generally tubular portion extending along the tubular wall and at a small radial distance therefrom so as to co-operate with said wall to define an annular passage for axial flow of the air stream leaving the passages and extending up to one of the disks of the rotor.

Thus, according to the invention, the air leaving the passages passing through the tubular wall is channeled along said wall to one of the rotor disks and can no longer reach the central space of the chamber between the disks. This prevents the air jets leaving the through passages from breaking up and prevents turbulence being formed that would generate head losses. The air guided along the tubular wall then flows naturally along the disks towards the axis of rotation, forming layers on the disks in which air speeds are essentially radial. These layers form part of phenomena that occur in the atmosphere and the oceans and they are known as Ekman layers.

The radial distance between the guide wall and the tubular wall connecting the disks together is determined in particular as a function of the flow rate of air bled through the above-mentioned passages. A compromise needs to be established in such a manner as to guide the bleed air as well as possible, without generating turbulence or eddies, and without impeding the flow of said air. Digital calculations concerning fluid dynamics can be used to determine this radial distance. By way of example it is of the order of a few millimeters or even a few centimeters.

In an embodiment, the reduction in head losses in the bleed air stream may be as great as 50% compared with the prior art. Because of this reduction in head losses, it is possible to envisage bleeding air from a stage of the compressor that is further upstream, thereby making it possible to reduce the specific consumption of the turbomachine, and also to reduce the temperature of the bleed air.

The air passages through the wall may be inclined relative to the axis of rotation of the rotor. By way of example, on going from upstream to downstream, these air passages are inclined towards the inside or towards the outside so as to give an axial component to the fluid leaving the air passages and thus facilitate the flow of the fluid along the tubular wall. These air passages may be formed in a downstream end portion of the tubular wall, downstream from a labyrinth seal for co-operating with a nozzle mounted between the two disks of the rotor.

According to another characteristic of the invention, the guide wall is fitted against and fastened to one of the disks inside the annular chamber.

This guide wall may be sectorized in order to make it easier to assemble, and by way of example it is made of light metal material or of composite material. It may be designed to be capable of being incorporated in an existing environment, and for example, at one end it may include an annular assembly flange for assembling with an annular flange for fastening the tubular wall to one of the disks.

The guide wall of the invention is less expensive and easier to install than the radial tubes used in the prior art. It is also more compact and simpler, which leads in particular to a saving of weight and an increase in the lifetime of the air bleed means of the invention.

The axial annular flow passage for the air stream defined between the guide wall and the tubular wall may be of section that is substantially constant. The cylindrical portion of the guide wall may be connected at one end to a substantially radial step extending towards the axis of rotation substantially parallel to and at a short distance from one of the disks in order to cooperate with said disk to define a radial annular flow passage for the air stream towards the above-mentioned sheath. This step preferably extends over a fraction of the radial dimension of the chamber. The guide wall is then substantially L-shaped in section.

The radial distance between the guide wall and the tubular wall, and the axial distance between the radial step and the disk are determined in particular so as to prevent air turbulence and eddies in the inter-disk chamber. By controlling the flow of air in the chamber in this way, head losses can be reduced considerably.

Preferably, the cylindrical portion of the guide wall includes studs bearing against the tubular wall in order to limit vibration and bending of said guide wall in operation.

The radial step and the guide wall may carry fins for guiding and/or deflecting the air stream in the radial passage. The fins enable the air to be entrained along the disk so that its speed is close to that of the disk (Ke=1). The fins may be inclined so that in operation they produce a suction effect on the air stream. The fins preferably press against one of the disks.

Advantageously, the end of the guide wall opposite from the radial step presses against the tubular wall and prevents the air leaving the through passages from flowing along the other disk.

The present invention also provides a turbomachine, such as an airplane turboprop or turbojet that is characterized in that it includes a compressor rotor as described above.

BRIEF DESCRIPTION OF THE SEVERAL VIEWS OF THE DRAWINGS

The present invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
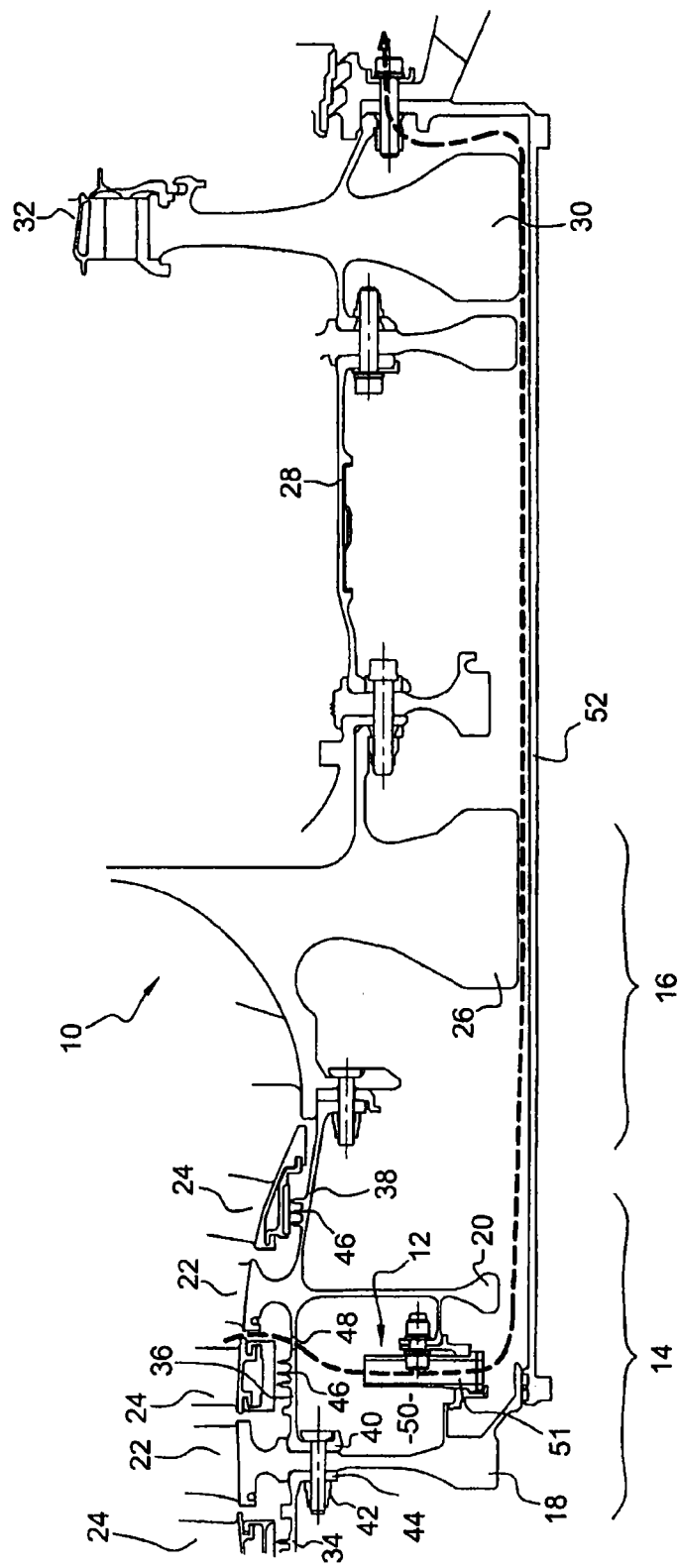
FIG. 1 is a fragmentary diagrammatic half-view in axial section of a turbomachine comprising in particular a compressor, a combustion chamber, and a turbine.

Reference is made initially to FIG. 1, which shows a portion of a turbomachine 10 fitted with centripetal air bleed means 12 of the prior art.

The turbomachine comprises in particular a compressor, a combustion chamber, and a turbine. The compressor 14, 16 is shown in part and comprises an upstream module having a plurality of axial compression stages 14 and a downstream module comprising a centrifugal compression stage 16. Each axial stage 14 of the compressor comprises a rotor wheel formed by a disk 18, 20 carrying blades 22 at its outer periphery, and a nozzle 24 situated downstream from the wheel and formed by an annular row of stationary nozzle vanes.

The rotor disks 18 and 20 are mounted on an axis that is common to them and to an impeller 26 of the centrifugal stage 16, which is itself fastened via an inner cylindrical casing 28 of the combustion chamber to a rotor wheel of the turbine. The turbine wheel is formed by a rim 30 carrying blades 32 on its outer periphery.

The disks 18, 20 of the compressor rotor are connected together and to the impeller 26 by tubular walls 34, 36, and 38 forming surfaces of revolution that are substantially cylindrical or frustoconical and that extend around the axis of rotation of the rotor.

FIG. 1 shows only two disks 18, 20 of the compressor rotor. The downstream disk 20 is formed as a single piece having a substantially cylindrical upstream wall 36 for fastening to the upstream disk 18, and with a substantially frustoconical downstream wall 38 for fastening of the impeller 26. The upstream end of the cylindrical wall 36 carries an annular flange 40 that is pressed against a downstream radial face of the disk 18 and that is fastened to said disk by nut-and-bolt type means 42. The walls 36, 38 may equally well be fitted against and fastened to the disk 20, e.g. by welding or brazing.

The upstream disk 18 is itself fastened to a disk (not shown) situated further upstream by another cylindrical wall 34. This wall 34 extends downstream from the disk that is not shown and its downstream end has an annular flange 44 for fastening to the disk 18. This flange 44 is pressed against an upstream radial face of the disk 18 and it is fastened to said disk by the above-mentioned means 42.

In known manner, the walls 34, 36, and 38 of the rotor of the compressor carry outer annular wipers 46 that co-operate in friction with elements of abradable material carried by the nozzles 24 for forming labyrinth type seals.

The centripetal air bleed means are mounted between the rotor disks of two consecutive stages of the compressor of the turbomachine. In the example shown, the means 12 are provided between the disks 18 and 20 and they include radial passages 48 formed through the wall 36 of the disk 20, and opening out into an annular chamber 50 defined by the disks 18 and 20 and by the wall 36 connecting these disks together. The bleed means 12 also comprise an annular row of radial tubes 51 that are arranged in the chamber 50 and that are fastened by appropriate means to the disks 18 and 20.

A portion of the air flowing in the flow section of the compressor passes radially from the outside towards the inside through the passages 48 in the wall 36 and penetrates into the annular chamber 50. This air is then constrained to pass through the radial tubes 51 in order to leave the chamber 50. The air leaving the tubes flows axially downstream around a cylindrical sheath 52 that extends coaxially inside the disks 18, 20, the tubes 51, and the impeller 26 of the compressor, and inside the annular rim 30 of the turbine. The air flows axially as far as the turbine and may be fed to systems for cooling and/or ventilating components of the turbine.

Nevertheless, the radial tubes 51 present the above-described drawbacks and they do not enable head losses in the air stream leaving the passages 48 through the wall 36 and inside the annular chamber 50 to be reduced.

The invention enables these problems to be remedied at least in part by means for guiding the air stream to one of the disks of the rotor of the compressor, situated either upstream or downstream from the passages through the wall 36.

The invention makes it possible to reduce in significant manner the head losses in the bleed air stream, and it makes it possible to envisage bleeding air from further upstream in the compressor so as to limit the specific consumption of the turbomachine.

Figure 2:
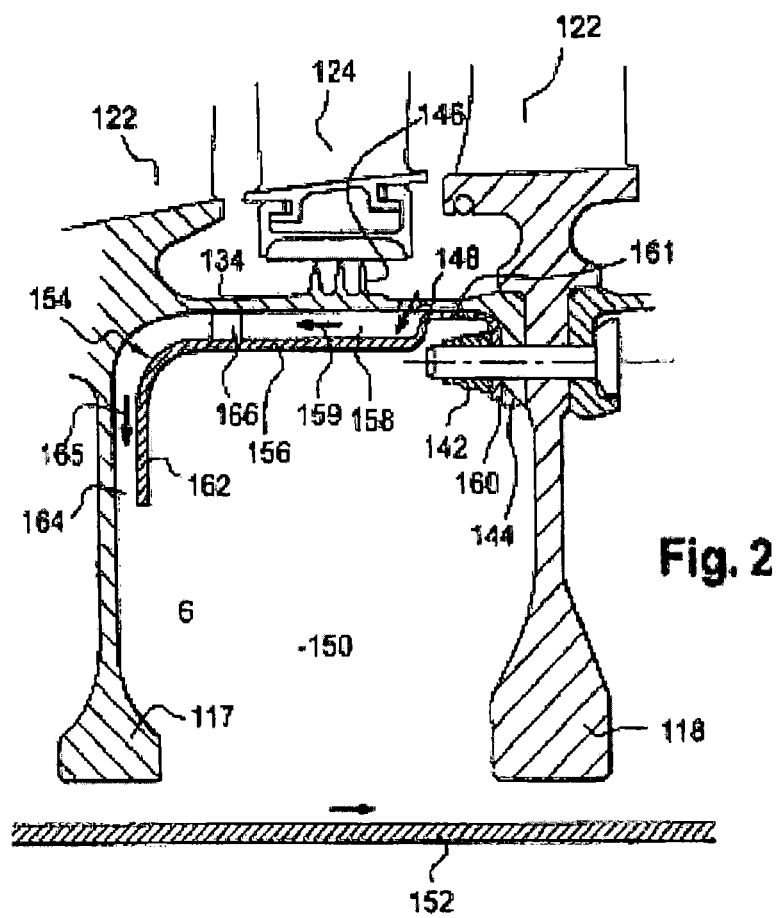
FIG. 2 is a fragmentary diagrammatic half-view in axial section and on a larger scale than FIG. 1 showing a compressor rotor fitted with centripetal air bleed means of the invention.

In the example shown in FIG. 2, elements described above with reference to FIG. 1 are designated by the same numbers plus one hundred. The air bleed means are here arranged upstream from the disk 118 (corresponding to the disk 18 of FIG. 1) between the disk 118 and a disk 117 of an upstream stage of the compressor.

Figure 3:
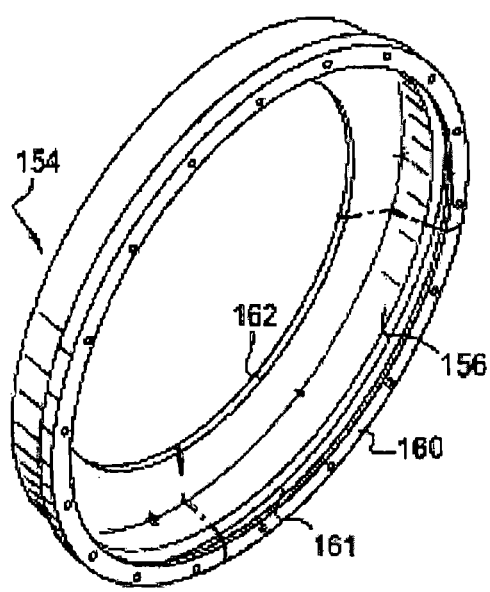
FIG. 3 is a diagrammatic perspective view of a cylindrical guide wall of the air bleed means of FIG. 2.

The air stream guide means of the invention comprise a wall 154 of substantially L-shaped section that is fitted to and fastened in the chamber 150 along the wall 134 connecting together the disks 117 and 118, this wall 154 being shown in perspective in FIG. 3.

The guide wall 154 is made of sheet metal and extends continuously over 360°. In a variant, it could be sectorized in order to make it easier to mount in the chamber 150, as shown in the dotted lines in FIG. 3.

The guide wall 154 has a middle portion 156 that is substantially cylindrical and that extends parallel to the wall 134 at a short radial distance therefrom over a major portion of its axial dimension. This cylindrical wall portion 156 co-operates with the inside cylindrical surface of the wall 134 to define a cylindrical annular passage 158 for axial flow of the bleed air stream, which passage is of section that is substantially constant. In the example shown, the bleed air stream flows axially from downstream to upstream along the passage 158 (arrow 159).

The air bleed passages 148 are formed over a downstream end portion of the wall 134, downstream from the wipers 146, and they open out into a downstream end portion of the annular passage 158. These passages 148 are inclined from upstream to downstream relative to the axis of rotation of the rotor, on going outwards. The air that passes through these passages 148 is thus oriented axially upstream so as to facilitate its axial flow from downstream to upstream along the passage 158.

The cylindrical portion 156 of the guide wall is connected at its upstream end by a cylindrical portion 161 of larger diameter to an annular flange 160 for fastening to the downstream disk 118. This flange 160 is pressed against the upstream face of the flange 144 of the wall 134, which is then clamped axially using the fastener means 142 between the flange 160 and the disk 118. The downstream cylindrical portion 161 of the guide wall 154 bears radially against the inner cylindrical surface of the wall 134, downstream from the passages 148 through said wall, so as to prevent the air leaving these passages from flowing along the disk 118.

The cylindrical portion 156 of the guide wall 154 is also connected at its upstream end to an annular rim 162 that extends substantially radially inwards from the cylindrical portion. Said rim 162 extends parallel to the disk 117 at a small axial distance therefrom so as to create a radial passage 164 for centripetal flow of the bleed air stream (arrow 165). The rim 162 extends radially over only a radially outer portion of the disk 117, since the bleed air stream flows naturally in operation along the disk 117 all the way to the sheath 152 by forming Ekman layers (arrow 166). The sheath 152 presents an axial dimension that is greater than that of the sheath of FIG. 1 and it extends axially inside the disks 117 and 118.

In the example shown, abutment-forming means are fitted against and fastened to the outer surface of the cylindrical portion 156 of the guide wall 154. These abutment means comprise studs 166 that are regularly distributed around the axis of rotation of the rotor. These studs 166 have their radially outer ends pressed against the inner cylindrical surface of the wall 134 so as to limit vibration and bending deformation of the guide wall 154 in operation.

Figure 4:
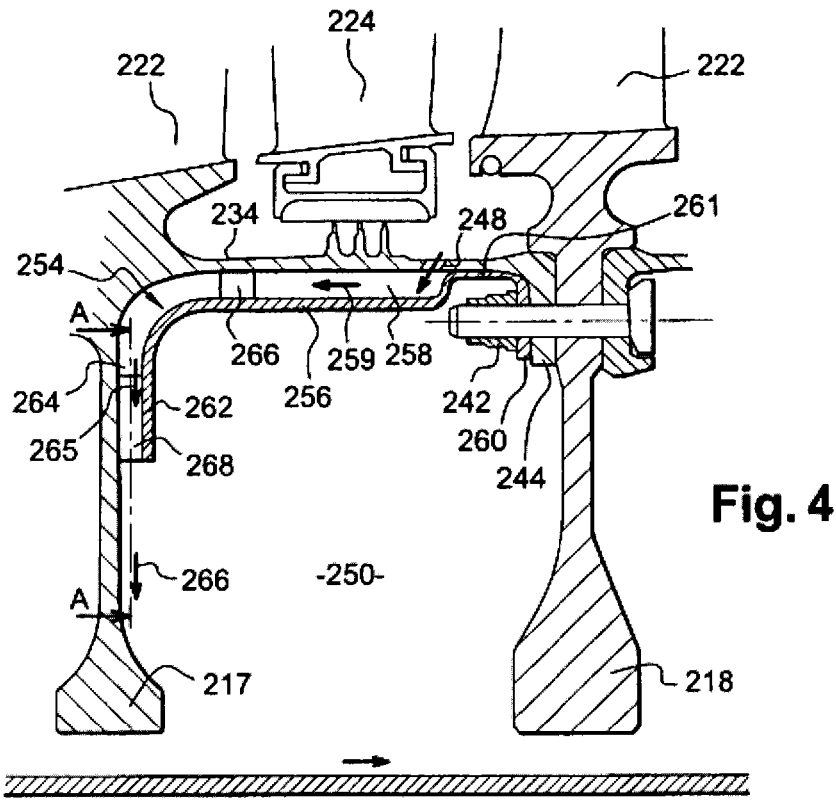
FIG. 4 is a view corresponding to FIG. 2 and shows a variant embodiment of the air bleed means of the invention.
Figure 5:
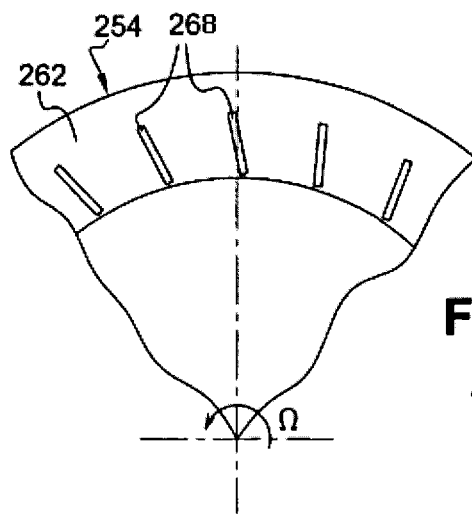
FIG. 5 is a section view on line A-A of FIG. 4.

In FIGS. 4 and 5, elements described above with reference to FIG. 2 are given the same reference numbers plus one hundred. The guide wall 254 here includes additional fins 268 that are fitted against and fastened on the upstream annular face of the rim 262 of the wall.

These fins 268 are regularly distributed around the axis of rotation of the rotor and they bear axially at their upstream ends against the disk 117.

As can be seen in FIG. 5, these fins are inclined so as to deflect the air flowing towards the radial passage 264 and reduce the speed of said air so that it does not exceed the speed of the disk 217 (Ke=1). The angle of inclination of the fins is such that it gives rise to a suction phenomenon on the air while it is flowing centripetally.

In yet another variant (not shown), the air bleed passages 148, 248 are formed through an upstream end portion of the wall 134, 234 and the bleed air is guided by the cylindrical wall 154, 254 axially from upstream to downstream until it reaches the disk 118, 218 situated downstream from the passages. The guide wall 154, 254 is then mounted in the inter-disk chamber 150, 250 so that its fastener flange 160, 260 is situated upstream instead of downstream, and the passages 148, 248 through the wall 134, 234 may extend from upstream to downstream on going inwards.

The temperature of the bleed air is of the order of 500 K and the bleed air flow rate is of the order of 100 grams per second (g/s).

The invention claimed is:

1. A compressor rotor of a turbomachine, the rotor comprising:
    at least first and second successive disks on a common axis carrying blades which are successive along the axis, the at least first and second successive disks being connected together by a generally tubular wall forming a surface of revolution about said axis; and
    centripetal air bleed means comprising air passages passing through the generally tubular wall near the second disk, the centripetal air bleed means opening out, near the first disk, into a chamber formed radially inside the generally tubular wall and between the two disks,
    wherein the centripetal air bleed means comprises:
        an air-guide wall mounted inside the chamber and comprising a substantially cylindrical portion extending along the generally tubular wall and at a small radial distance therefrom so as to define with the generally tubular wall an annular passage for axial flow of the air stream leaving the passages, the generally tubular wall extending up to the first disk of the rotor.

2. A rotor according to claim 1, wherein the air passages passing through the generally tubular wall are inclined relative to the axis of the rotor.

3. A rotor according to claim 1, wherein the air passages are formed through a downstream end portion of the wall, downstream from a labyrinth seal for co-operating with a nozzle mounted between the two disks of the rotor.

4. A rotor according to claim 1, wherein the guide wall is fitted against and fastened to one of the disks inside the chamber.

5. A rotor according to claim 4, wherein the guide wall is sectorized.

6. A rotor according to claim 4, wherein the guide wall includes an annular flange at one end for fastening to an annular flange of the tubular wall and to one of the disks.

7. A rotor according to claim 1, wherein the axial annular flow passage for the air stream is of a section that is substantially constant.

8. A rotor according to claim 1, wherein the cylindrical portion of the guide wall carries studs bearing against the tubular wall to limit vibration and bending of the guide wall in operation.

9. A rotor according to claim 1, wherein the guide wall includes at one end a radial rim that extends along the first disk towards the axis of rotation over a fraction of the radial dimension of the chamber.

10. A compressor rotor of a turbomachine, the rotor comprising:
at least two disks on a common axis carrying blades and connected together by a generally tubular wall forming a surface of revolution coaxially about the axis of the disk;
centripetal air bleed means comprising air passages passing through the wall and opening out into a chamber formed inside the tubular wall and between the two disks; and
an air-guide wall mounted inside the chamber and comprising a substantially cylindrical portion extending along the tubular wall and at a small radial distance therefrom so as to co-operate with the wall to define an annular passage for axial flow of the air stream leaving the passages and extending up to one of the disks of the rotor,
wherein the guide wall includes at one end a radial rim that extends along one of the disks towards the axis of rotation over a fraction of the radial dimension of the chamber, and
wherein the radial rim carries fins for at least one of deflecting or slowing down the air stream, which fins are pressed against the disk.

11. A rotor according to claim 10, wherein the fins are inclined so that, in operation, the fins produce a suction effect on the air stream.

12. A rotor according to claim 9, wherein an end of the guide wall opposite from the radial rim is pressed against the generally tubular wall and prevents air leaving the through passages from flowing along the second disk.

13. A rotor according to claim 1, wherein the guide wall is made of a light metallic material or of a composite material.

14. A turbomachine comprising a compressor rotor, the compressor rotor comprising:
at least first and second successive disks on a common axis carrying blades which are successive along the axis, the at least first and second successive disks being connected together by a generally tubular wall forming a surface of revolution about said axis; and
centripetal air bleed means comprising air passages passing through the generally tubular wall near the second disk, the centripetal air bleed means opening out, near the first disk, into a chamber formed radially inside the generally tubular wall and between the two disks,
wherein the centripetal air bleed means comprises:
an air-guide wall mounted inside the chamber and comprising a substantially cylindrical portion extending along the generally tubular wall and at a small radial distance therefrom so as to define with the generally tubular wall an annular passage for axial flow of the air stream leaving the passages, the generally tubular wall extending up to the first disk of the rotor.

15. A rotor according to claim 1, wherein, in the flowing direction for air along said common axis, in the compressor rotor, the second disk is located downstream from the first disk, so that, in the annular passage for axial flow of the air stream, air circulates from downstream to upstream.

16. A compressor rotor of a turbomachine, the rotor comprising:
at least two disks on a common axis carrying blades and connected together by a generally tubular wall forming a surface of revolution coaxially about the axis of the disk;
centripetal air bleed means which comprises air passages passing through the wall and which opens out into a chamber formed radially inside the tubular wall and between the two disks; and
an air-guide wall mounted inside the chamber, the air-guide wall comprising:
a substantially cylindrical portion extending along the tubular wall and at a small radial distance therefrom so as to define with the wall an annular passage for axial flow of the air stream extending up to one of the disks of the rotor,
a curvature in front of said one of the disks, which extends the substantially cylindrical portion at an end, and which deviates the air stream in contact with said one of the disks, and
a radial rim which extends the curvature along said one of the disks, towards the axis of rotation over a fraction of the radial dimension of the chamber.

17. A rotor according to claim 16, wherein the at least two disks and the generally tubular wall are formed in one piece only.

18. A rotor according to claim 16, wherein:
the at least two disks comprises a first and a second successive disks on said common axis,
the carried blades are successive along the axis,
the air passages pass through the tubular wall near the second disk, and
said one of the disks in front of which the curvature is situated and in contact to which the air stream is deviated is the first disk.

19. A rotor according to claim 16, wherein:
the at least two disks are successive on said common axis and comprise respectively a first disk and a second disk located downstream from the first disk,
the air passages passes through the tubular wall near the second disk, and
said one of the disks in front of which the curvature is situated and in contact to which the air stream is deviated is the first disk.

* * * * *